Jan. 14, 1969  P. V. B. CORNELL  3,421,724
SLIDING MOTOR BASE
Filed Jan. 12, 1967
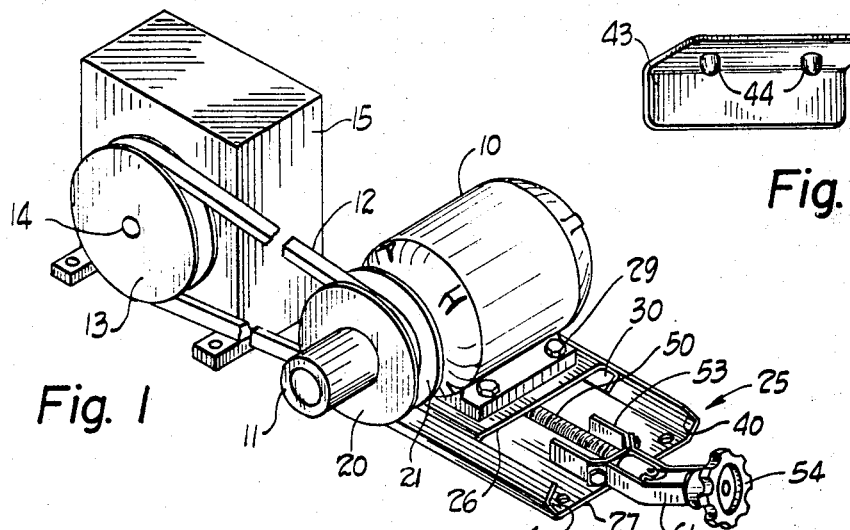
Fig. 1
Fig. 5
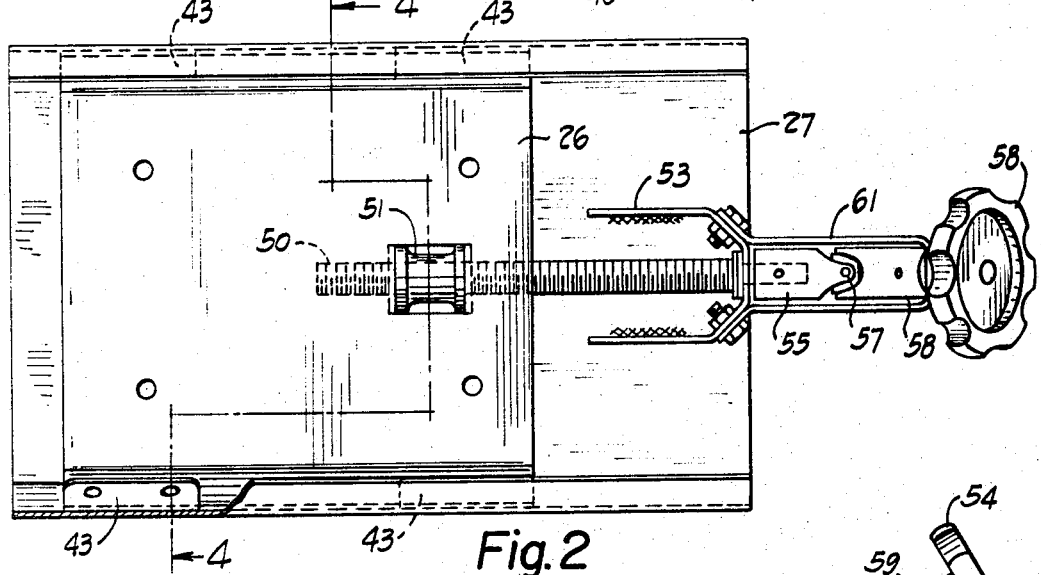
Fig. 2
Fig. 3
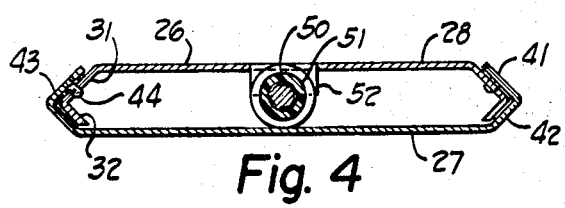
Fig. 4
INVENTOR.
PETER V. B. CORNELL
BY Watts Hoffmann
Fisher & Heinke
ATTORNEYS.

United States Patent Office 3,421,724
Patented Jan. 14, 1969

3,421,724
SLIDING MOTOR BASE
Peter V. B. Cornell, Cleveland, Ohio, assignor to
Speed Selector Inc.
Filed Jan. 12, 1967, Ser. No. 608,844
U.S. Cl. 248—23    6 Claims
Int. Cl. E02d 27/44; F16h 7/10; F16c 29/00

ABSTRACT OF THE DISCLOSURE

A motor base having a base plate and a slide plate spaced from the base plate, the two plates being provided with V-shaped flanges at their side edges which cooperate to guide the slide plate for sliding movement.

Background of the invention

The present invention relates generally to motor bases, and more specifically to a sliding motor base adapted to support a motor for adjustable linear movement.

The typical construction of an adjustable motor base includes a stationary portion which is bolted to a supporting surface and a movable member which is carried by the stationary portion and supports the motor. One disadvantage of prior art constructions was that the base would twist so as to cause misalignment of the various parts of the base when it was bolted to a non-planar supporting surface. This misalignment could cause binding of the various parts of the base so that considerable force was required to move the motor supporting member.

Since the supporting surfaces to which motor bases are secured are frequently uneven, a conventional expedient was to design motor bases with large clearances in order to prevent binding of the movable portions. Because of this design expedient, many prior art motor bases would rattle when in use.

Attempts to overcome the problems of binding and rattling frequently resulted in complex, expensive and difficult to assemble motor bases. One such construction was comprised of a motor support member guided for movement on rods which extended along the sides of the stationary portion. The construction was expensive to build because of the several parts which had to be accurately made and assembled together.

Summary of the invention

The motor base of the present invention consists essentially of a base plate and a slide plate having a flat motor-supporting portion which is spaced from the base plate. The side edges of both plates are bent to form cooperating V-shaped flanges which guide the slide plate for linear movement. In the preferred embodiment the legs of the V-shaped flanges form oblique angles with the plates and anti-friction shoes are disposed between the legs of the flanges to minimize the force of sliding friction.

An important feature of the new motor base of this invention resides in the formation and cooperation of the flanges along the side edges of the slide and base plates. The preferred V-shaped flanges cooperate to maintain the two plates in spaced relation and present only two surfaces of sliding contact at each side of the motor base. This cooperative structure minimizes sliding friction and enables the slide plate to be easily moved relative to the base plate even though the base plate is twisted by securing it to a non-planar surface. A further advantage of the new motor base is that it can be made with sufficiently close tolerances to prevent rattling of the slide plate when in use.

Another important feature of the invention resides in the simplified, inexpensive construction of the new motor base. The base consists essentially of only two members, the base plate and the slide plate, and these members can be easily formed and assembled together.

An object of the invention is to provide a new motor base having a construction such that the slide plate of the base can be moved with a minimum amount of force.

Another object of the invention is to provide a new motor base having cooperating structure which prevents the slide plate of the base from binding even when the base is twisted on its mounting.

Still another object of the invention is to provide a new motor base having the characteristics set forth in the previous paragraph wherein the slide plate will not rattle when in use.

A further object of the invention is to provide a new motor base having a simplified and inexpensive construction.

Other objects and features of the invention will become apparent from the following detailed description of the preferred embodiment and the accompanying drawing.

Description of the drawing

FIGURE 1 is a perspective view diagrammatically illustrating a motor supported on the motor base of the invention and connected to a machine by a suitable belt and pulley drive;

FIGURE 2 is a top plan view of the motor base;

FIGURE 3 is a vertical cross-sectional view of the motor base shown in FIG. 2;

FIGURE 4 is a cross-sectional view taken on the line 4—4 of FIG. 2; and

FIGURE 5 is an enlarged perspective view of one of the antifriction shoes embodied in the new motor base.

Description of the preferred embodiment

Referring now to the drawing and to FIG. 1 in particular, there is shown a motor 10 and a variable pitch pulley 11 which is mounted on the drive shaft of the motor. The variable pitch pulley 11 is drivingly connected by a V-belt 12 to a companion pulley 13 of fixed pitch diameter. The companion pulley 13 is mounted on the input shaft 14 of a machine generally designated by reference numeral 15.

The variable pitch pulley 11 may be of any suitable construction, such as disclosed in U.S. Patent No. 3,129,-597, and may include a pair of pulley halves 20, 21 that drivingly engage the sides of the V-belt 12. The pulley halves 20, 21 are relatively movable axially of the shaft of the motor 10 for the purpose of varying the speed of the drive. The speed of the input shaft 14 can be varied by changing the pitch diameter of the variable pitch pulley 11 and thereby changing the pitch diameter ratio of the pulleys 11, 13. When the pulley halves 20, 21 are relatively moved apart, the belt 12 is drawn radially inwardly along their conical faces to decrease the effective pitch diameter of the pulley 11. Conversely, when the pulley halves 20, 21 are brought together the V-belt 12 is forced radially outwardly to increase the effective pitch diameter of the pulley 11.

With the drive illustrated in FIG. 1, the change in the pitch diameter of the pulley 11 is effected by varying the distance between the shaft 14 and the shaft of the motor 10. To this end the motor 10 is mounted on a sliding motor base 25 which comprises the present invention. As is hereinafter described in more detail, the base 25 is operable to move the motor 10 toward and away from the shaft 14 and thereby to vary the pitch diameter of the pulley 11.

Referring now to FIGS. 2, 3 and 4, the motor base 25 is shown to be comprised of a slide plate 26 and a base plate 27. The slide plate 26 includes a flat portion 28 to which the motor 10 is secured by suitable fasteners 29. The side edges of the slide plate 26 are bent away from the motor 10 to form V-shaped flanges 30. Each of the V-shaped flanges includes a leg 31 which is integral with the portion 28 and forms an oblique angle therewith, and a second leg 32 which extends inwardly and at an angle to the first leg 31.

The V-shaped flanges 30 of the slide plate 26 are slidably received in correspondingly configured, V-shaped grooves 40 which are formed by upwardly bent side edges of the base plate 27. Each of the upwardly bent side edges of the base plate 27 includes a terminal leg portion 41 which is parallel and adjacent to the flange leg 31 and a leg 42 which is parallel and adjacent to the flange 32.

The cooperating V-shaped formation of the slide plate flanges 30 and the grooves 40 of the base plate 27 is an important aspect of the present invention. With a belt drive such as illustrated in FIG. 1, it is necessary to maintain the belt in constant driving alignment with the pulleys 11, 13 in order to prevent excessive belt wear. Thus, any movement of the motor 10 which would cause misalignment of the belt 12 must be avoided. This objective is achieved by the present invention, since the cooperation between the V-shaped flanges 30 and the V-shaped grooves 40 assures a rigid motor support and prevents the slide plate 26 from either twisting laterally or pulling up at the ends. At the same time, the formation of the flanges 30 and the grooves 40 presents only two surfaces of sliding contact at each side of the motor base 25, thereby minimizing the force of sliding friction.

In the preferred embodiment of the present invention, the force of silding friction between the slide plate 26 and the base plate 27 is further minimized by the provision of anti-friction shoes 43. As shown in FIG. 2, two shoes 43 may be provided at each side of the slide plate 26 between the legs of the flanges 30 and the legs 41, 42 of the grooves 40. Each of the shoes 43 may be an integral V-shaped member made of a suitable plastic material. As best shown in FIG. 5, one of the legs of the shoe 43 may be formed with projecting lugs 44. The spaced lugs 44 fit into holes formed in hte flanged legs 31 of the slide plate 26 in order to hold the shoes 43 in position.

Movement of the slide plate 26 is effected by a threaded shaft 50. The shaft 50 is threadedly engaged through a nut 51 which may be made of any suitable material, such as nylon, metal or the like. In the illustrated construction of the invention, the nut 51 is secured to the underside of the slide plate 26 by downwardly projecting tangs 52 which are punched from the flat portion 28 of the slide plate. The ends of the tangs 52 are notched to permit passage of the shaft 50. The shaft 50 is rotatably mounted through the end of a generally U-shaped bracket 53 welded to an end of the base plate 27.

The shaft 50 is rotated by a handle 54. The handle 54 extends upwardly at an angle to the shaft 50 for convenience in turning and is connected to the shaft by a suitable, rotatable swivel connection. This swivel connection includes a member 55 which is pinned to the end of the shaft 50 adjacent the bracket 53. A block 56 is rotatably carried on a pin 57 extending between projecting ears of the member 55. A second swivel member 58 has one end secured to the handle 54 by an interconnecting rod 59. The opposite end of the member 58 is formed with projecting ears disposed on opposite sides of the block 56 and connected thereto by a pin 60. The rod 59 is rotatably mounted through the end of a U-shaped bracket 60 which has its legs fixed to the end of the bracket 53 .

In use the base plate 27 is secured in a fixed position, as by bolting it to a supporting surface. When the handle 54 and the shaft 50 are rotated in one direction, the slide plate 26 will be caused to move toward the pulley 13 because of the cooperation between the nut 51 and the shaft. This movement of the slide plate 26 causes the V-belt 12 to move radially outwardly on the pulley 11 to produce an increased effective pitch diameter of the pulley. When the handle 54 and the shaft 50 are rotated in the opposite direction, the slide plate 26 and the motor 10 will be drawn away from the pulley 13. This movement causes the belt 12 to be drawn radially inwardly on the pulley 11 to produce a smaller effective pitch diameter and a slower speed of the shaft 14.

It will be apparent from the foregoing description that the motor base of this invention is characterized by a sturdy and yet inexpensive construction. The motor base 10 essentially consists of only two members, the slide plate 26 and the base plate 27. Both of these members can be cut from steel plate stock and by a simple bending operation the side edges of the plates can be formed to provide the cooperating V-shaped flanges 30 and grooves 40. The cooperation between the V-shaped flanges 30 and the grooves 40 is such that the slide plate 26 will not rattle and will not bind even though the base plate 27 may be twisted. In addition the novel formation of the V-shaped flanges 30 and grooves 40 provide only two surfaces of sliding contact at each side of the motor base and thereby minimizes the force of sliding friction and the force necessary to rotate the handle 54 to move the slide plate 26.

Many modifications and variations of the invention will ve apparent to those skilled in the art in the light of the foregoing detailed disclosure. Therefore, it is to be understood that, within the scope of the appended claims, the invention can be practiced otherwise than as specifically shown and described.

What is claimed is:

1. A motor base comprising a slide plate having a flat motor supporting portion and side edges which define V-shaped flanges, each of said flanges including a first leg which is integral with said flat portion and extends outwardly to form an oblique angle therewith and a second leg which is integral with said first leg and extends inwardly at an angle therewith, and a base plate having V-shaped side edges which correspond in configuration to said V-shaped flanges of said slide plate.

2. A motor base as claimed in claim 1 including means connected between said plates for moving said slide plate relative to said base plate.

3. A motor base as claimed in claim 2 wherein said means comprises a nut mounted on one of said plates, a threaded shaft rotatably mounted on the other of said plates and engaged with said nut, and a handle connected to said shaft.

4. A motor base comprising a slide plate having a flat motor supporting portion and side edges which define V-shaped flanges, each of said flanges including a first leg which is integral with said flat portion and extends outwardly to form an oblique angle therewith and a second leg which is integral with said first leg and extends inwardly at an angle therewith, and a base plate having side edges which define V-shaped grooves in which said flanges of said slide plate are slidably received, each of said edges of said base plate including a pair of legs which are parallel and adjacent to said first and second legs of the slidably received slide plate flange.

5. A motor base as claimed in claim 4 including a nut connected to said slide plate, bracket means connected to said base plate, a threaded shaft rotatably mounted by said bracket means and engaging said nut, and a handle on said shaft.

6. A motor base as claimed in claim 4 including antifriction shoes disposed between said legs of said slide plate flanges and said adjacent legs of said base plate.

References Cited

UNITED STATES PATENTS 2,498,392  2/1950  Boyle ---------------- 248—23
3,054,645  9/1962  Evans ---------------- 308—3

JOHN PETO, *Primary Examiner.*

U.S. Cl. X.R.

74—242.13; 308—6